United States Patent
Rachow

(10) Patent No.: US 11,097,694 B2
(45) Date of Patent: Aug. 24, 2021

(54) TELESCOPING DEVICE FOR CLEANING A VEHICLE SURFACE

(71) Applicant: A. Raymond et Cie, Grenoble (FR)

(72) Inventor: Larry M. Rachow, Lenox, MI (US)

(73) Assignee: A. RAYMOND ET CIE, Grenoble (FR)

( * ) Notice: Subject to any disclaimer, the term of this patent is extended or adjusted under 35 U.S.C. 154(b) by 196 days.

(21) Appl. No.: 16/355,040

(22) Filed: Mar. 15, 2019

(65) Prior Publication Data

US 2020/0290572 A1    Sep. 17, 2020

(51) Int. Cl.
| | |
|---|---|
| *B05B 15/74* | (2018.01) |
| *B60S 1/56* | (2006.01) |
| *B05B 1/30* | (2006.01) |
| *B60S 1/48* | (2006.01) |
| *B60S 1/52* | (2006.01) |

(52) U.S. Cl.
CPC ............ *B60S 1/528* (2013.01); *B05B 1/3006* (2013.01); *B05B 15/74* (2018.02); *B60S 1/481* (2013.01); *B60S 1/56* (2013.01); *B60S 1/52* (2013.01)

(58) Field of Classification Search
CPC ....... B05B 1/3006; B05B 15/70; B05B 15/72; B05B 15/74; B05B 1/10; B60S 1/52; B60S 1/528; B60S 1/56; B60S 1/563; B60S 1/58; B60S 1/60
USPC .......................................... 239/284.1, 284.2
See application file for complete search history.

(56) References Cited

U.S. PATENT DOCUMENTS

| | | | |
|---|---|---|---|
| 4,913,352 A | 4/1990 | Witty et al. | |
| 4,955,543 A * | 9/1990 | Orth ........................ | B60S 1/528 239/205 |
| 5,083,339 A | 1/1992 | Bristow | |
| 5,242,114 A * | 9/1993 | Camier .................... | B60S 1/528 239/284.2 |
| 5,269,464 A | 12/1993 | Epple et al. | |
| 5,605,286 A | 2/1997 | Orth et al. | |
| 5,762,271 A | 6/1998 | Lind et al. | |
| 5,769,323 A | 6/1998 | Hartick et al. | |
| 5,769,528 A | 6/1998 | Dinant | |
| 5,957,385 A | 9/1999 | Suhring et al. | |
| 6,152,385 A | 11/2000 | Nuber et al. | |

(Continued)

FOREIGN PATENT DOCUMENTS

| | | |
|---|---|---|
| DE | 3518685 | 6/1986 |
| DE | 4121316 A1 | 1/1992 |

(Continued)

OTHER PUBLICATIONS

Extended European Search Report for Application No. 20161775.0 dated Jul. 29, 2020.

*Primary Examiner* — Cody J Lieuwen
(74) *Attorney, Agent, or Firm* — Warner Norcross + Judd LLP

(57) ABSTRACT

The present disclosure provides a telescoping device for cleaning a vehicle surface. The telescoping device includes an extendable piston moveable from an inactive position to active position at a predetermined extension pressure. The piston includes a supply tube, a cleaning fluid outlet provided at a distal end of the supply tube, and a check valve comprising a cracking pressure that is greater than the predetermined extension pressure. Vehicles and systems incorporating a telescoping cleaning device are also provided.

23 Claims, 7 Drawing Sheets

(56) References Cited

U.S. PATENT DOCUMENTS

| | | | |
|---|---|---|---|
| 6,234,410 B1 | 5/2001 | Martin et al. | |
| 6,438,789 B1 | 8/2002 | Murawa et al. | |
| 6,463,621 B1* | 10/2002 | Zimmer | B60S 1/522 15/250.04 |
| 6,752,329 B1* | 6/2004 | Price | B60S 1/528 239/284.2 |
| 6,769,630 B1 | 8/2004 | Leipzinger | |
| 6,905,078 B1 | 6/2005 | Gattuso et al. | |
| 7,555,807 B1 | 7/2009 | Mastandrea | |
| 2001/0030874 A1 | 10/2001 | Nishiyama et al. | |
| 2002/0060254 A1 | 5/2002 | Bandemer et al. | |
| 2003/0066909 A1 | 4/2003 | Jenkins | |
| 2003/0116645 A1 | 6/2003 | Hirose et al. | |
| 2006/0027678 A1 | 2/2006 | Kimura | |
| 2006/0113404 A1* | 6/2006 | Sato | B60S 1/528 239/284.2 |
| 2006/0114666 A1 | 6/2006 | Sakai et al. | |
| 2006/0273139 A1 | 12/2006 | Sakai et al. | |
| 2006/0289678 A1 | 12/2006 | Sakai et al. | |
| 2007/0267517 A1 | 11/2007 | Mota Lopez et al. | |
| 2008/0087744 A1 | 4/2008 | Baba | |
| 2008/0093478 A1 | 4/2008 | Keller et al. | |
| 2008/0210780 A1 | 9/2008 | Discher et al. | |
| 2009/0014555 A1 | 1/2009 | Litvinov et al. | |
| 2009/0084418 A1 | 4/2009 | Nakada et al. | |
| 2011/0155823 A1 | 6/2011 | Hartnell | |
| 2011/0215173 A1 | 9/2011 | Hartnell | |
| 2011/0277263 A1* | 11/2011 | Guo | B60S 1/528 15/250.002 |
| 2013/0240569 A1 | 9/2013 | Hamza et al. | |
| 2014/0008460 A1 | 1/2014 | Massaro et al. | |
| 2017/0259789 A1 | 9/2017 | McAndrew | |
| 2017/0313287 A1 | 11/2017 | Davies et al. | |

FOREIGN PATENT DOCUMENTS

| | | | |
|---|---|---|---|
| DE | 4401744 A1 | 7/1994 | |
| DE | 19811827 A1 | 10/1998 | |
| DE | 10125898 A1 | 12/2001 | |
| DE | 102007010089 A1 | 9/2008 | |
| DE | 102008051586 A1 | 4/2010 | |
| EP | 0262402 A2 | 4/1988 | |
| EP | 0395931 A2 | 11/1990 | |
| EP | 0572147 A1 | 5/1993 | |
| EP | 0743232 A2 | 11/1996 | |
| FR | 2605906 A1 | 5/1988 | |
| FR | 2657057 A1 | 7/1991 | |
| FR | 2671529 A1 | 7/1992 | |
| FR | 2671773 A1 | 7/1992 | |
| FR | 2674204 | 9/1992 | |
| FR | 2674805 | 10/1992 | |
| FR | 2674806 A1 | 10/1992 | |
| FR | 2682658 A1 | 4/1993 | |
| FR | 2684342 A1 | 6/1993 | |
| FR | 2720044 | 5/1994 | |
| FR | 2698598 A1 | 6/1994 | |
| FR | 2704497 | 11/1994 | |
| FR | 2710889 | 4/1995 | |
| FR | 2738166 A1 | 3/1997 | |
| FR | 2759337 A1 | 8/1998 | |
| FR | 2794082 A1 | 12/2000 | |
| FR | 2836842 | 9/2003 | |
| FR | 2836842 A1 * | 9/2003 | B60S 1/528 |
| FR | 2896747 | 8/2007 | |
| FR | 2903949 | 1/2008 | |
| FR | 3021014 | 11/2015 | |
| JP | 2004-50079 | 2/2004 | |
| WO | 20090138105 A1 | 11/2009 | |

* cited by examiner

US 11,097,694 B2

TELESCOPING DEVICE FOR CLEANING A VEHICLE SURFACE

FIELD OF THE INVENTION

The present disclosure generally relates to vehicle cleaning systems and devices, and, more specifically, to telescoping devices for cleaning a vehicle surface.

DESCRIPTION OF THE RELATED ART

Various cleaning devices for vehicles are known, including nozzles that clean windows, headlights, and other vehicle surfaces. Exterior cameras and driver assistance sensors are increasing in popularity, and many vehicle models have these as standard or optional equipment. Due to the impact of environmental elements to these cameras and sensors, these systems can experience a loss in effectiveness. Said nozzles can be used to clean the lenses of these systems. Self-driving or autonomous vehicles require an even greater number of cameras and sensors for navigation and guidance, driving and safety, and internal performance.

Some of said cleaning devices are telescopic, and include a spraying element that is telescopically extendable to an active or operating position. The cleaning device is in fluid communication with a source of pressurized cleaning fluid, and the spraying element can be configured to extend once fluid pressure exceeds a predetermined amount. When retracted or inactive, the nozzle device can be concealed with a part of the vehicle structure.

Conventional designs for telescopic cleaning devices that use the pressure of the cleaning fluid for extension movement of the spraying element require a fluid valve establishing fluid communication with the spraying element once the cleaning device is fully extended. The valves are placed proximally of the spraying element, requiring an elongated space to accommodate the device. Such conventional designs are bulky due to the number of parts required for controlling movement and fluid flow. In newer vehicle designs requiring a greater number of cameras and sensors, such as for self-driving or autonomous vehicles, space constraints make conventional telescopic nozzle devices undesirable and impractical.

SUMMARY OF THE INVENTION

A telescoping device for cleaning a vehicle surface is provided herein. In an exemplary embodiment, the telescoping device for cleaning a vehicle surface includes a housing having a proximal inlet end and a distal outlet end, an extendable piston arranged within the housing and moveable from an inactive position to active position at a predetermined extension pressure, and a return spring biasing the piston toward the inactive position. The piston includes a piston body, a supply tube coupled with the piston body at a proximal end of the supply tube, a cleaning fluid outlet provided at a distal end of the supply tube, wherein the at least one cleaning fluid outlet is retracted into the housing in the inactive position and the at least one cleaning fluid outlet is extended from the housing in the active position, and a check valve coupled with the piston body for movement therewith and comprising a cracking pressure that is greater than the predetermined extension pressure.

In another embodiment, the telescoping device is incorporated in a vehicle having a vehicle surface.

In yet another embodiment, the telescoping device is incorporated in a system for cleaning a vehicle surface, the system including a fluid reservoir and a pump in fluid communication with the fluid reservoir and with the telescoping device.

As described further below, embodiments of the telescoping device, vehicle, and system disclosed herein provide for an improved cleaning of surfaces, such as cameras, sensors, headlights or headlamps, windshield, window, other vehicle surfaces, or other non-vehicle surfaces. The telescoping device is compact, and can telescope between an inactive or non-spraying position and an active or spraying position.

These and other features and advantages of the present disclosure will become apparent from the following description of particular embodiments, when viewed in accordance with the accompanying drawings and appended claims.

DETAILED DESCRIPTION OF THE INVENTION

A telescoping device provided for cleaning a vehicle surface is described below. As will be appreciated from the description here, the telescoping device has multiple applications, but is generally used as a cleaning device for vehicle surfaces, such as cameras, sensors, headlights or headlamps of vehicles, and may be provided on a vehicle in concealed fashion, for example within the bumper or panel of a vehicle. It is to be understood that the telescoping device may be used to clean other surfaces, such as a windshield, window, other vehicle surfaces, or other non-vehicle surfaces. Such a telescoping device can be provided in a system or vehicle, and can telescope between an inactive or non-spraying position and an active or spraying position. At least some embodiments of the telescoping device provided herein functions to telescope to the active position prior to spraying. This can be accomplished through the various elements thereof, as described below, including a check valve that is carried by a moveable piston, where the check valve will open after the piston has extended to the active position. To provide a compact cleaning device that takes up minimal space within the vehicle, the check valve can be integrated into the piston, and the piston can retract fully, or substantially fully, into a housing in the inactive position.

Figure 1:
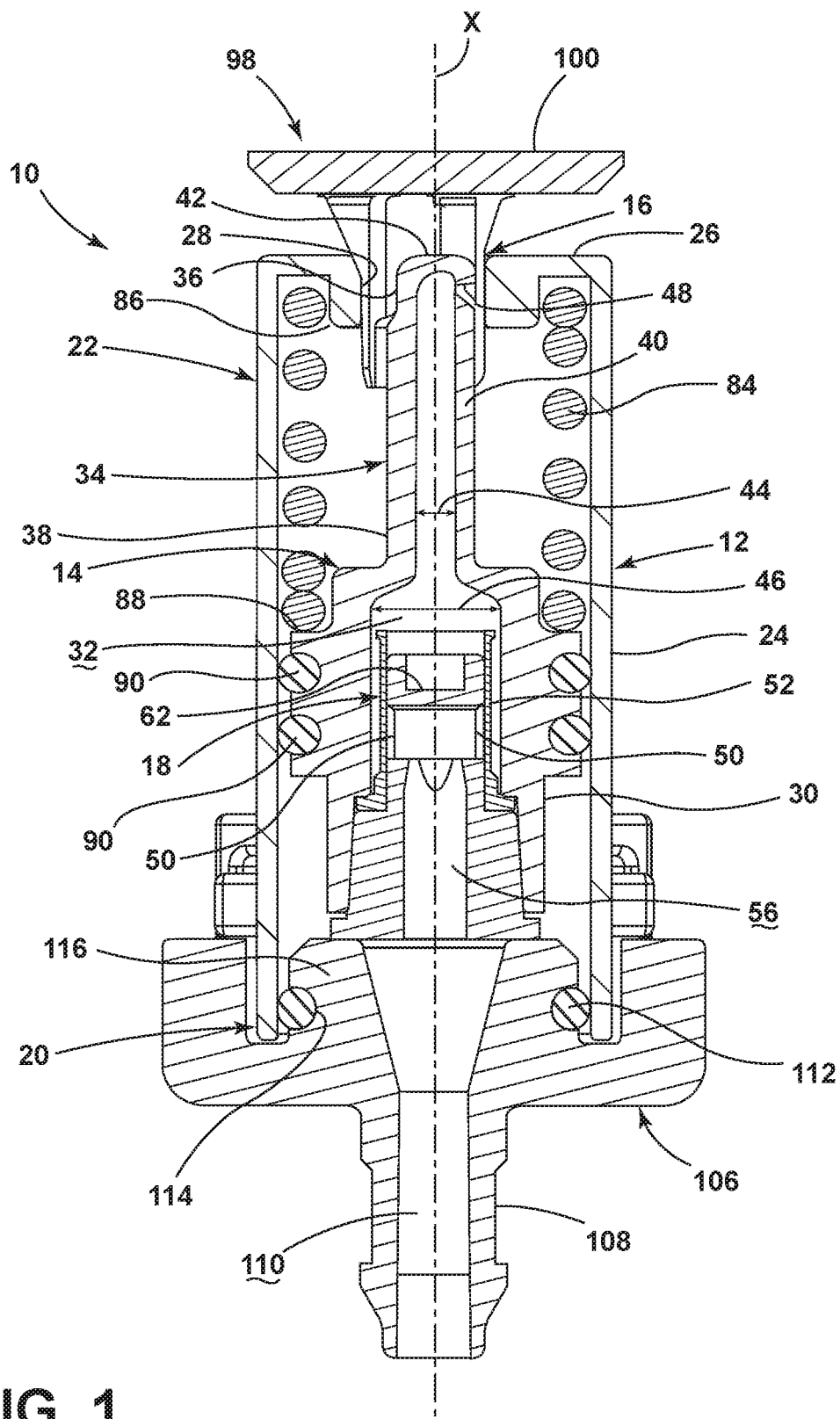
FIG. 1 is a cross-sectional view of a cleaning device in an inactive state according to one embodiment of the invention.
Figure 2:
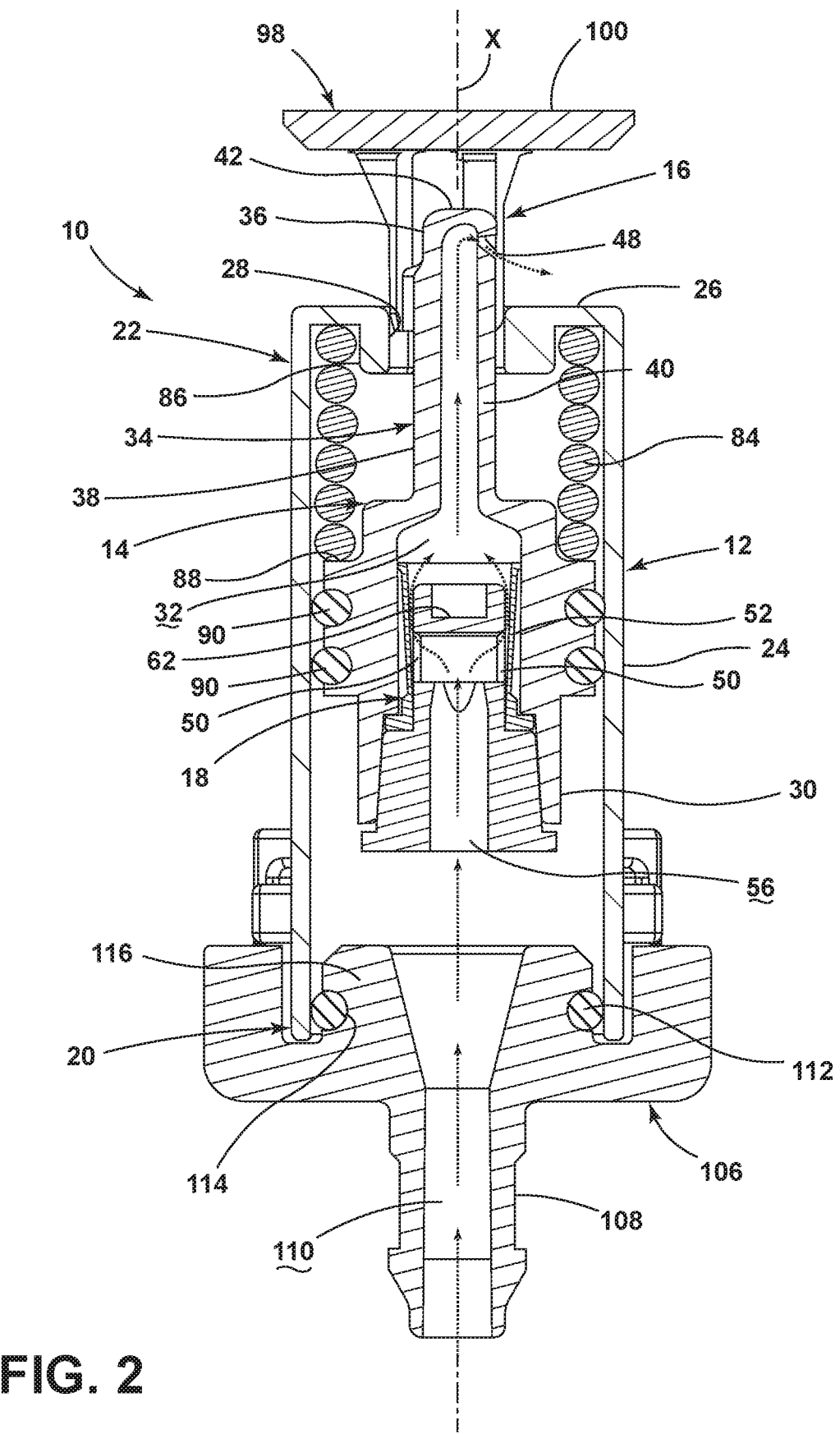
FIG. 2 is a cross-sectional view of the cleaning device of FIG. 1 in an active state.
Figure 3:
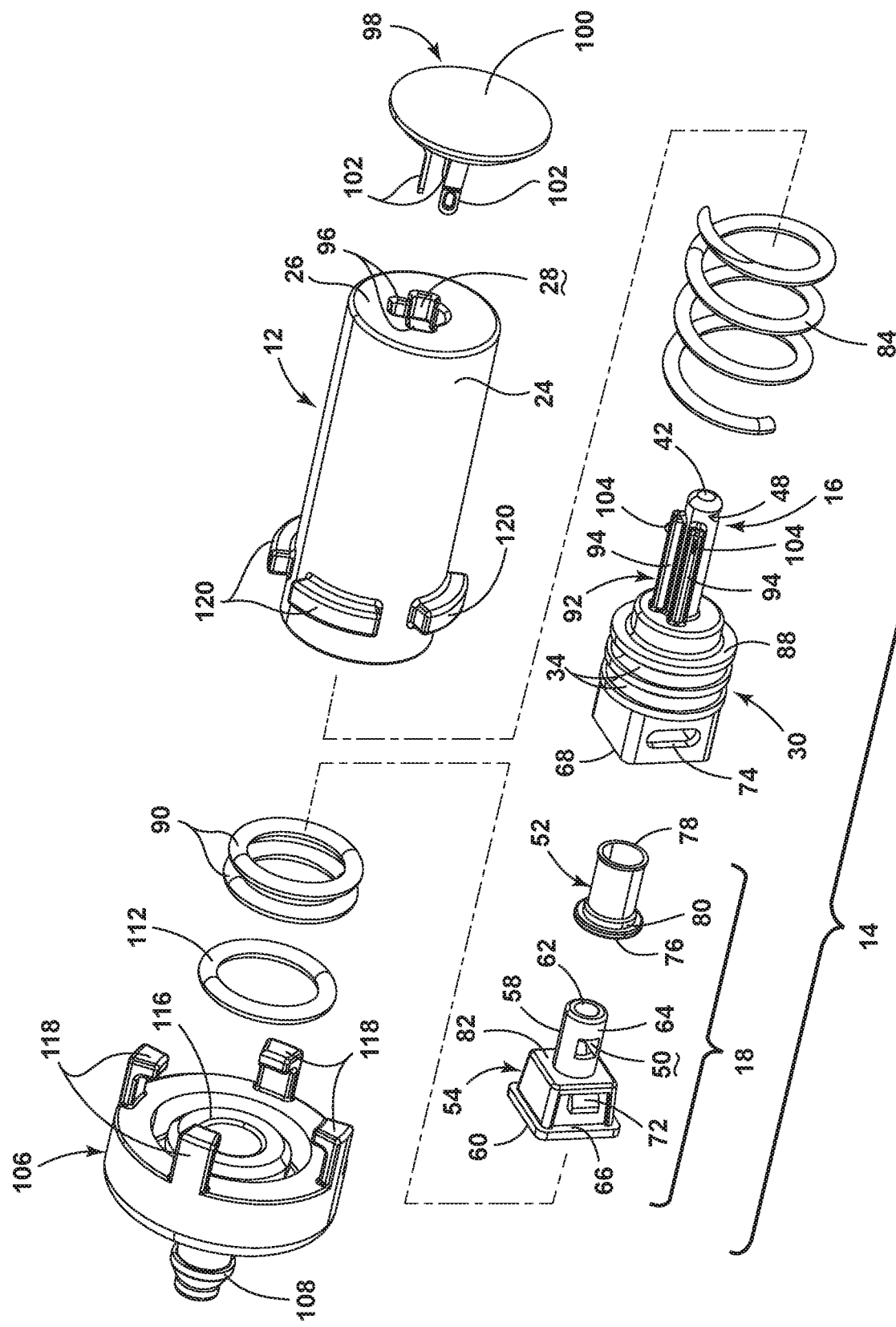
FIG. 3 is an exploded view of the cleaning device of FIG. 1.

In FIGS. 1-3, a telescoping device according to a first embodiment of the invention is illustrated and generally designated 10. The telescoping device 10 includes a housing 12, a piston 14 arranged within the housing 12, at least one cleaning fluid outlet 16, and a check valve 18 (or non-return valve). The piston 14 is extendable, and can move from an inactive position to active position at a predetermined extension pressure, described in further detail below. The cleaning fluid outlet 16 and check valve 18 can be carried by, coupled with, or otherwise moveable with the piston 14. In moving to the active position, the cleaning fluid outlet 16 telescopes relative to the housing 12 to an extended position, an example of which is shown in FIG. 2, and once the cleaning fluid outlet 16 has extended, the check valve 18 opens, all of which is described in greater detail below. In the active position, the cleaning device 10 sprays a cleaning media or cleaning fluid to clean a vehicle surface. The term "cleaning media" or "cleaning fluid" encompasses substances that are capable of flowing, including liquid, gas, e.g. air, and mixtures thereof.

The housing 12 includes a proximal inlet end 20 and a distal outlet end 22. The housing 12 can include a peripheral wall 24 elongated along a longitudinal device axis X, with the piston 14 configured for linear reciprocal movement along the axis X. The peripheral wall 24 can be annular, as shown herein, and comprise one continuous sidewall. In other embodiments, the peripheral wall 24 can be non-annular, and/or can comprise a plurality of sidewalls. The inlet and outlet ends 20, 22 of the housing 12 can be at least partially open. In the illustrated embodiment, the distal outlet end 22 of the housing 12 can be partially closed by a distal end wall 26 having an opening 28 therein. Optionally, the housing 12 can be provided with mounting brackets or other attachment features (not shown) for installation on a vehicle.

The piston 14 includes a piston body 30 defining a hollow interior 32, a cleaning supply tube 34 coupled with the piston body 30, the at least one cleaning fluid outlet 16, and the check valve 18, which can be coupled with the piston body 30 for movement therewith.

The at least one cleaning fluid outlet 16 can be provided at a distal end 36 of the supply tube 34. Optionally, two or more cleaning fluid outlets 16 can be provided at the distal end 36 of the supply tube 34. A proximal end 38 of the supply tube 36 can be formed with, or otherwise connected to, the piston body 30. In the illustrated embodiment, the piston body 30 and the supply tube 34 are integrally formed, such as by plastic injection molding.

The supply tube 34 can include a peripheral wall 40 elongated along the device axis X, with the supply tube 34 configured for linear reciprocal movement along the device axis X along with the piston body 30. The peripheral wall 40 can be annular, as shown herein, and in other embodiments, the peripheral wall 40 can be non-annular. The supply tube 34 can be open at its proximal end 38 to the hollow interior 32 of the piston body 30 and can be open or closed at its distal end 36. In the illustrated embodiment, the distal end 36 is closed by a distal end wall 42. The at least one cleaning fluid outlet 16 can optionally be formed through the peripheral wall 40 as shown, or through the distal end wall 42 in other embodiments of the cleaning device 10.

The supply tube 34 can have an inner diameter 44 as defined by the peripheral wall 40. The inner diameter 44 of the supply tube 34 can be less than an inner diameter 46 of the piston body 30 defined by the hollow interior 32.

The at least one cleaning fluid outlet 16 can be any type of cleaning fluid outlet, suitable for the purposes described herein, including the spraying or dispensing of cleaning fluid to a vehicle surface. In the illustrated embodiment, the cleaning fluid outlet 16 comprises a radial aperture 48 provided in the distal end 36 of the supply tube 34, though the number and disposition of apertures can vary in other embodiments of the invention. The aperture 48 can have any shape and be provided in any form, including, but not limited to, a slot, slit, opening, etc., in the supply tube 34. As shown, the aperture 48 can be a slot- or slit-shaped aperture in the peripheral wall 40 of the supply tube 34, and can be disposed proximally of the distal end wall 42.

The at least one cleaning fluid outlet 16 comprising the radial aperture 48 can be configured to direct a spray of cleaning fluid generally radially with respect to the longitudinal device axis X. Alternatively, the at least one cleaning fluid outlet 16 can be configured to direct a spray of cleaning fluid generally axially along the device axis X, generally tangentially relative to the device axis X, at an angle between the radial, axial, and/or tangential directions, or in multiple directions relative to the device axis X.

The at least one cleaning fluid outlet 16 can be configured to produce various spray patterns, i.e. a static fan spray, a static jet spray, etc. As shown herein, the aperture 48 of the cleaning fluid outlet 16 can be molded or otherwise formed in the supply tube 34 for a static fan spray. Alternatively, a spray-building element such as a chip or eyeball can be provided at the cleaning fluid outlet 16 for achieving other spray patterns, such as a jet spray, an oscillating fan spray or a combination jet and fan spray. Alternatively, instead of producing a spray of cleaning fluid, the at least one cleaning out 16 can dispense a stream of cleaning fluid, or otherwise disburse cleaning fluid toward the vehicle surface to be cleaned.

The check valve 18 allows ingress of cleaning fluid into the supply tube 34 once the fluid pressure exceeds a predetermining cracking pressure, as described in more detail below. In the embodiment shown herein, the check valve 18 includes at least one orifice 50 in fluid communication with the hollow interior 32 of the piston body 30 and an elastomeric sleeve 52 surrounding the at least one orifice 50. Other embodiments of the check valve 18 are possible, including, but not limited to, a ball check valve, a diaphragm check valve, a duckbill check valve, a swing check valve, a lift-check valve, etc.

To keep the cleaning device 10 small and compact, the check valve 18 is integrated into the piston 14. As shown herein, the check valve 18 can be provided at a proximal end of the piston 14, in line with the supply tube 34. In other embodiments, the check valve 18 can be carried elsewhere on the piston 14, such as concentrically within the supply tube 34. Yet other locations of check valve integration with the piston 14 are possible.

In one embodiment, the check valve 18 comprises a valve body 54 having the at least one orifice 50. The elastomeric sleeve 52 is received over the valve body 54 to overlie the at least one orifice 50. In at least the inactive position, the check valve 18 is closed and the at least one orifice 50 is sealed by the sleeve 52. When the check valve 18 is open, the at least one orifice 50 can be in fluid communication with the supply tube 34, directly or via the hollow interior 32 of the valve body 30. A fluid passage 56 can be formed in the valve body 54 in fluid communication with the at least one orifice 50, and provides a pathway for cleaning fluid through the valve body 54.

The check valve 18 can comprise more than one orifice 50. In the illustrated embodiment, multiple orifices 50, for example two orifices 50, are provided in the valve body 54, through the number of orifices 50 can vary in other embodiments of the invention. The orifices 50 can be radially spaced about the valve body 54, relative to the longitudinal device axis X. In embodiments with two orifices 50 as shown, the orifices 50 can be disposed on opposing sides of the valve body 54, i.e. can be diametrically opposed. The orifices 50 can have any shape and be provided in any form, including but not limited to slots, slits, apertures, openings, etc., in the valve body 54.

The valve body 54 can comprise a hollow tip 58 projecting into the hollow interior 32 of the piston body 30. The tip 58 of the valve body 54 can include the at least one orifice 50 and can support the elastomeric sleeve 52 thereon. As shown, the tip 58 can include radially opposing orifices 50. The fluid passage 56 can extend from an inlet at a proximal end 60 of the valve body 54 and through the tip 58 to the orifices 50, which can define the outlet of the fluid passage 56. A distal end 62 of the valve body 54 can be closed, with the orifices 50 being provided proximally of the closed distal end 62. The tip 58 can define an outer surface or sealing surface 64 on either side of orifices 50 against which the sleeve 52 rests in the inactive position. The valve body 54 can include a flange 66 at the proximal end 60. The flange 66 can be continuous or non-continuous about the valve body 54, and can project substantially radially outwardly.

In the illustrated embodiment, the valve body 54 is coupled with the piston body 30, and can more specifically be coupled with a proximal end 68 of the piston body 30. The valve body 54 can be coupled with the piston body 30 using any suitable mechanical coupling or other interlock. In other embodiments, the valve body 54 can be integrally formed with the piston body 30, such as by plastic injection molding.

In one embodiment, valve body 54 can be coupled with the piston body 30 by a snap fit coupling or joint. The valve body 54 can comprise a protruding part, which is snap fit with a mating component on the piston body 30; alternatively, the piston body 30 can comprise the protruding part that is snap fit with a mating component on the valve body 54. In one embodiment, the protruding part is a protrusion 72 on an outer surface of the valve body 30, and can comprise a hook, stud, lug, bead, or other engagement element. The protrusion 72 catches in a depression, undercut, or slot 74 in the piston body 30 forming the mating component. The piston body 30 may be deflected briefly during the joining operation, as the valve body 54 slides into place within the hollow interior 32 of the piston body 10. The number and location of protrusions 72 and slots 74 can vary; optionally two protrusions 72 and slots 74 are provided and can be can be diametrically opposed on the valve body 54 and piston body 30, respectively.

The sleeve 52 can be an elastomeric sleeve that is radially expandable under pressure to permit flow of cleaning fluid through the check valve 18, and is radially contractible under decreasing pressure to prevent flow of cleaning fluid through the check valve 18. In illustrative embodiment, the sleeve 52 is manufactured from an elastomeric material that is both resilient and flexible. In one example, the elastomeric material can be silicone rubber or EPDM (ethylene propylene diene methylene rubber).

The sleeve 52 can be tubular and includes a proximal end 76 and a distal end 78. The proximal end 76 of the sleeve 54 can be sealed to valve body 54, and more specifically can be sealed about the tip 58 of the valve body 54. The proximal end 76 of the sleeve 52 can comprise a flange 80 projecting substantially radially outwardly relative to the device axis X. The flange 80 can be continuous or non-continuous about the sleeve 52. The flange 80 is held between the piston body 30 and the distal-facing shoulder 82 on valve body 54. The distal end 78 of the sleeve 52 can be free, i.e. unattached or unsealed to the valve body 54, to allow the sleeve 52 to flex resiliently to an expanded or stressed state.

The distal end 78 of the sleeve 52 can extend beyond the distal end 62 of the valve body 54, and project into the hollow interior 32 of the piston body 30. This overhang ensures sealing of the sleeve 52 to the valve body 54, including for a variety of tolerance conditions. The overhanging distal end 78 also directs cleaning fluid flow in a direction parallel to the longitudinal device axis X, which in the illustrated embodiment is coincident with a longitudinal axis of the sleeve 52, reducing turbulent flow and encouraging laminar flow as the cleaning fluid exits the valve body 54 and passes through the piston body 30.

The check valve 18 can have a predetermined cracking pressure, i.e. a minimum differential upstream pressure between the valve inlet, defined at the proximal end 60 of the valve body 54 in the illustrated embodiment, and the valve outlet, defined by the at least one orifice 50 in the illustrated embodiment, at which the check valve 18 will operate. The predetermined cracking pressure can be specified by the sleeve 52, which expands under pressure to permit flow of cleaning fluid through the check valve 18. The cracking pressure of the sleeve 52 can be at least partially determined by the hardness of the material for the sleeve 52, for example with materials having higher shore durometer having higher cracking pressure. The cracking pressure can range, for example, from 3-6 PSI.

FIG. 1 shows the sleeve 52 in its normal, relaxed state, i.e., with the telescoping device 10 in the inactive position, while FIG. 2 shows the sleeve 52 in its expanded or stressed state, i.e. with the telescoping device 10 in the active position, or as the telescoping device 10 transitions toward the active position. The sleeve 52 is normally contracted onto the tip 58 of the valve body 54, against the sealing surface 64, and is resiliently urged to an expanded state by fluid pressure exceeding the cracking pressure. The sleeve 52 responds to an increase in pressure to or above the cracking pressure by flexing away from the sealing surface 64, allowing cleaning fluid to flow through the orifices 50.

As disclosed above, the piston 14 is moveable between an inactive position, an example of which is shown in FIG. 1, in which the supply tube 34 is retracted relative to the distal outlet end 22 of the housing 12, and an active position, an example of which is shown in FIG. 2, in which the supply tube 34 is extended relative to the distal outlet end 22 of the housing 12. In the active position, the at least one cleaning fluid outlet 16 can face a surface to be cleaned, for instance the lens or cover of a vehicle camera, sensor, or headlight. In the illustrated embodiment, the supply tube 34 is retracted into the housing 12 in the inactive position, and the supply tube 34 is extended from the housing 12 in the active position. More particularly, the supply tube 34 can be extendable and retractable through the opening 28 in the distal end wall 26 of the housing 12.

Optionally, the supply tube 34 can retract fully, or substantially fully, into the housing 12 in the inactive position. In the illustrated embodiment, the distal end 36 of the supply tube 34 is substantially flush with the distal outlet end of the housing 12 in the inactive position. With this arrangement, the cleaning fluid outlet 16 lies inside the housing 12 in the inactive position, which can protect the cleaning fluid outlet 16 and supply tube 34 when not in use.

More particularly, as shown in the illustrated embodiment, the distal end wall 42 closing the distal end 36 of the supply tube 34 can be substantially flush with or otherwise form a contiguous or continuous surface with the distal end wall 26 of the housing 12 in the inactive position. A small discontinuity in the otherwise contiguous or continuous surface formed by the distal end walls 26, 42 in the inactive position may, for example, occur at the opening 28 in the distal end wall 26 of the housing 12 to provide clearance for sliding movement of the supply tube 34 through the opening 28 as the supply tube moves between the inactive and active positions. Other small breaks or discontinuities are also possible while still forming an overall contiguous or continuous surface by the retraction of the supply tube 34 into the housing 12 in the inactive position.

Alternatively, a portion of the supply tube 34 can remain outside the housing 12, and more particularly outside the distal end wall 26 of the housing 12, in both the inactive and active positions. In one example (not shown), the distal end 36 of the supply tube 34, including the cleaning fluid outlet 16, can remain outside the housing 12, and more particularly outside the distal end wall 26, in both the inactive and active positions.

The piston 14 can be biased to the inactive position by a return spring 84, such as a coil spring. The return spring 84 can be positioned between the housing 12 and the piston 14, and can more specifically be positioned between the distal end wall 26 of the housing 12 and the piston body 30 of the piston 14. The distal end wall 26 of the housing 12 can include a collar 86 surrounding the opening 28, and a first end of the spring 84 can be received between the housing peripheral wall 24 and the collar 84. The piston body 30 can include a shoulder 88 that extends radially toward the peripheral wall 24, and a second end of the spring 84 can be received between the shoulder 88 and the housing peripheral wall 24.

A piston sealing member can be provided between the piston 14 and the housing 12 for sealing the interface between the piston 14 and housing 12, and preventing leaks at the distal outlet end 22 of the housing 12. In the illustrated embodiment, the piston sealing member is pair of O-ring seals 90 on the piston body 30 in sealing engagement with an inner side of the peripheral wall 24 of the housing 12. Alternatively, one O-ring seal or more than two O-rings seals can be provided. The piston body 30 can include annular grooves 92 shaped to partially receive the O-ring seals 90.

Optionally, the supply tube 34, or another portion of the piston 14, can be keyed with the housing 12 to maintain alignment between the piston 14 and housing 12, and prevent torsion or twisting of the supply tube 34 as it extends and retracts. In the illustrated embodiment, the supply tube 34 includes ribs 94 and the distal outlet end 22 of the housing 12 includes slots 96 around the opening 28 that receive the ribs 94 on the supply tube 34. The keyed coupling (or keyed joint) provided by the ribs 94 and slots 96 ensure that the supply tube 34, and piston 14, smoothly translate along the longitudinal device axis X without twisting within the housing 12. The ribs 94 on the supply tube 34 can be elongated to maintain engagement between the ribs 94 and slots 96 in both the retracted and extended positions of the supply tube 34.

The telescoping device 10 can optionally comprise a cover 98 coupled with or otherwise provided on the distal end 36 of the supply tube 34. The cover 98 can comprise a trim component of a vehicle and can include a Class A surface 100, i.e. a visible exterior surface of the vehicle. By virtue of its provision on the supply tube 34, the cover 98 moves with the extendable piston 14 between the inactive and active positions. In the inactive position, the cover 98 can be flush with or otherwise form a contiguous or continuous surface with the vehicle. In particular, the Class A surface 100 of the cover can be flush with or otherwise form a contiguous or continuous surface with another Class A surface of the vehicle. In the active position, the cover 98 is extended outwardly from the vehicle surface and cleaning fluid outlet 16 can face a surface to be cleaned, for instance the lens or cover of a vehicle camera, sensor, or headlight.

The cover 98 can be coupled with or otherwise provided on the supply tube 34 using any suitable connection. In one embodiment, cover 98 can be coupled with the supply tube 34 by a snap fit coupling or joint. In the illustrated embodiment, slotted arms 102 project from a surface of the cover 98 opposite the Class A surface 100 and are snap fit with corresponding protruding parts 104 on the supply tube 34, such can comprise hooks, studs, lugs, beads, or other engagement elements.

With the cover 98 being flush with or otherwise form a contiguous or continuous surface with the vehicle, the housing 12 can be non-visible from the exterior of the vehicle. The distal end wall 26 of the housing 12 in particular is not flush with or otherwise form a contiguous or continuous surface with the vehicle, but rather can be hidden or otherwise enclosed by the vehicle surface or another trim component. In the inactive position, the cover 98 also hides the supply tube 34 from view.

The telescoping device 10 can optionally comprise an end cap 106 coupled at the proximal inlet end 20 of the housing 12. The proximal inlet end 20 of the housing 12 can be open, with the end cap 106 closing the open inlet end 20. The end cap 106 can include an inlet port 108 connectable to a source of pressurized cleaning fluid and defining a fluid passage 110 through the end cap 106. Optionally, the cleaning fluid can be supplied to the inlet port 108 by a pump (for example, pump 142 in FIG. 5) in fluid communication with a reservoir of cleaning fluid (for example, reservoir 136 in FIG. 5). A conduit, hose, duct, and/or other tubing (for example conduit 140 in FIG. 5) in fluid communication with the pump can be connected to the inlet port 108. Alternatively, the inlet port 108 can be formed with, or otherwise provided on, the housing 12.

A cap sealing member can be provided between the end cap 106 and the housing 12 for sealing the interface between the end cap 106 and housing 12, and preventing leaks at the inlet end 20 of the housing 12. In the illustrated embodiment, the cap sealing member is an O-ring seal 112 on the end cap 106 in sealing engagement with an inner surface of the peripheral wall 24 of the housing 12. Alternatively, more than one O-ring seal 112 can be provided. The end cap 106 can include an annular groove 114 shaped to partially receive the O-ring seal 112. The annular groove 114 can be provided on a collar 116 surrounding the fluid passage 110.

The end cap 106 can be coupled with or otherwise provided on the housing 12 using any suitable connection. In one embodiment, end cap 106 can be coupled with the housing by a quick-connect coupling or a bayonet connection. In the illustrated embodiment, the end cap 106 has a plurality of bayonet-type hooks 118 that are interfitted into the spaces between protrusions 120 on the housing 12 so that upon relative rotation of the end cap 106 and housing 12, the hooks 118 pass over the protrusions 120 to lock the end cap 106 to the housing 12.

In the inactive position, as shown in FIG. 1, the valve body 54 can abut the end cap 106. More particularly, a proximal end of the valve body 54 can abut an inner surface of the end cap 106, for instance a distally facing surface of the collar 116, with the fluid passage 56 of the valve body 54 in register with the inlet port 108. In the active position, as shown in FIG. 1, the valve body 54 can be spaced from the end cap 106 by the extension of the piston 14.

Optionally, the telescoping device 10 can having a heating element (not shown) to produce a heated spray of cleaning media. The heating element may be placed anywhere in or adjacent to the flow path through the telescoping device 10 suitable for transferring heat to the cleaning media flowing through the flow path, such as adjacent to the supply tube 34 or the cleaning fluid outlet 16. In one example, the heating element can be a PTC heating element.

In operation, the piston 14 can be hydraulically actuated by the way of the pressure of the cleaning fluid supplied to the device 10, which overcomes the pressure of the return spring 84 acting on the piston 14 and extends the cleaning fluid outlet 16 to the active position once the fluid pressure exceeds the predetermined extension pressure. The check valve 18 is configured to have a cracking pressure that is greater than the predetermined extension pressure at which the piston 14 extends to the active position, and so the check valve 18 remains closed as the piston 14 moves to the extended position. Once in the extended position, fluid pressure continues to increase, and once pressure on the upstream side, i.e. the inner side, of the sleeve 52 exceeds the cracking pressure, the sleeve 52 flexes to the expanded or stressed state, shown in FIG. 2, allowing fluid to flow through the orifices 50 of the valve body 54. FIG. 2 shows the flow of cleaning fluid with arrows. As it is illustrated in FIG. 2, the distal end 78 of the sleeve 52 is separated from the sealing surface 64 of the valve body 54 to unseal the orifices 50, thus, allowing the cleaning fluid to flow through the orifices 50. The cleaning fluid flows from the orifices 50, through the supply tube 34, and sprays from the cleaning fluid outlet 16, as indicated by the arrows in FIG. 2.

Once cleaning fluid supply to the inlet port 108 ceases, the pressure drops and the sleeve 52 automatically contracts back to its normal condition, i.e. the original closed position shown in FIG. 1, and seals the orifices 50. The sleeve 52 can contract under its own elasticity. In addition, as pressure decreases, the return spring 84 forces the piston 14 back into the housing 12 to the inactive position shown in FIG. 1.

Figure 4:
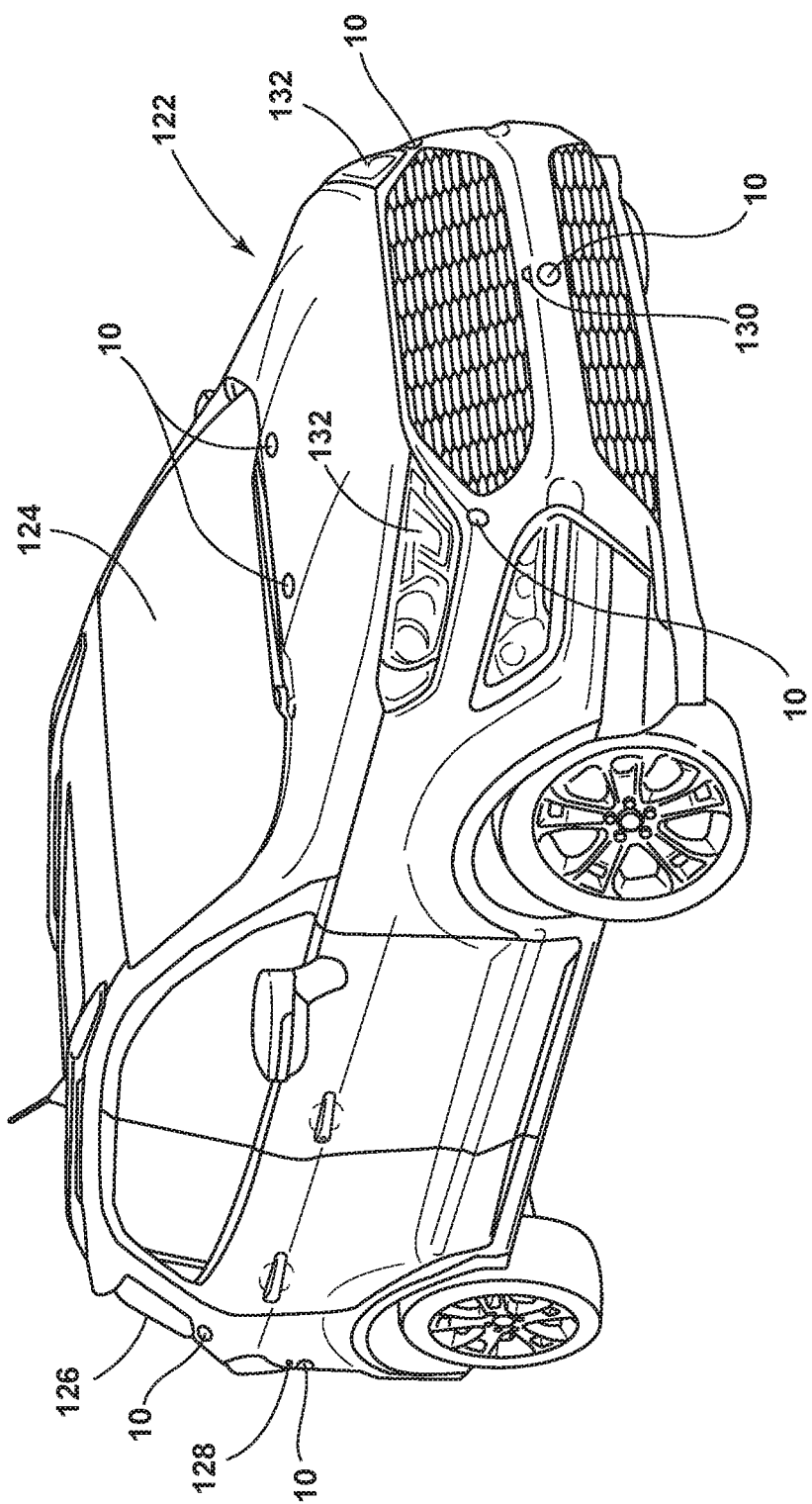
FIG. 4 is a schematic view of a vehicle comprising the cleaning device of FIG. 1 according to another embodiment of the invention, with the cleaning device in an inactive state.

FIG. 4 shows an embodiment of a vehicle 122 comprising at least one telescoping device 10 described with respect to FIGS. 1-3. The vehicle 122 can comprise various vehicle surfaces, some examples of which include a front windshield 124, a rear windshield 126, a camera 128, a sensor 130, and headlights or headlamps 132. One or more telescoping device 10, can be mounted in various locations on the vehicle 122 to the clean various vehicle surfaces 124-132. For example, the telescoping device 10 can be hood mounted, under hood mounted, cowl screen mounted, or wiper arm mounted. In another example, the telescoping device 10 can be integrated in or mounted on a rear end spoiler or a center high-mounted stop lamp (CHMSL). It is noted that the telescoping devices 10 are schematically represented in FIG. 4, and are not necessarily drawn to scale relative to the vehicle 122 or the various vehicle surfaces. It is also noted that the number and location of the telescoping devices 10 for the vehicle 122 can vary from the illustrated embodiment, and it will be understood by those skilled in the art that the vehicle 122 can use different numbers of telescoping devices 10 and in different locations in accordance with the principles of the present disclosure. In addition, although the illustrated embodiment of the vehicle 122 includes one rear camera 128 and one front sensor 130, it will be understood by those skilled in the art that the vehicle 122 can use different numbers of cameras and sensors in various locations on the vehicle 122 in accordance with the principles of the present disclosure.

In FIG. 4, the telescoping devices 10 are in the inactive position, and the exposed portion of the device 10 (i.e. the cover 98 of FIG. 1) can be flush with or otherwise form a contiguous or continuous surface with the vehicle 122. In particular, the exposed portion of the device 10 (i.e. the cover 98 of FIG. 1) can be flush with or otherwise form a contiguous or continuous surface with a Class A surface of the vehicle 122. In the active position, the cleaning fluid outlet 16 (FIG. 1) is extended outwardly from the vehicle surface and can face the surface to be cleaned, i.e. the front windshield 124, a rear windshield 126, a camera 128, a sensor 130, and headlights or headlamps 132.

Figure 5:
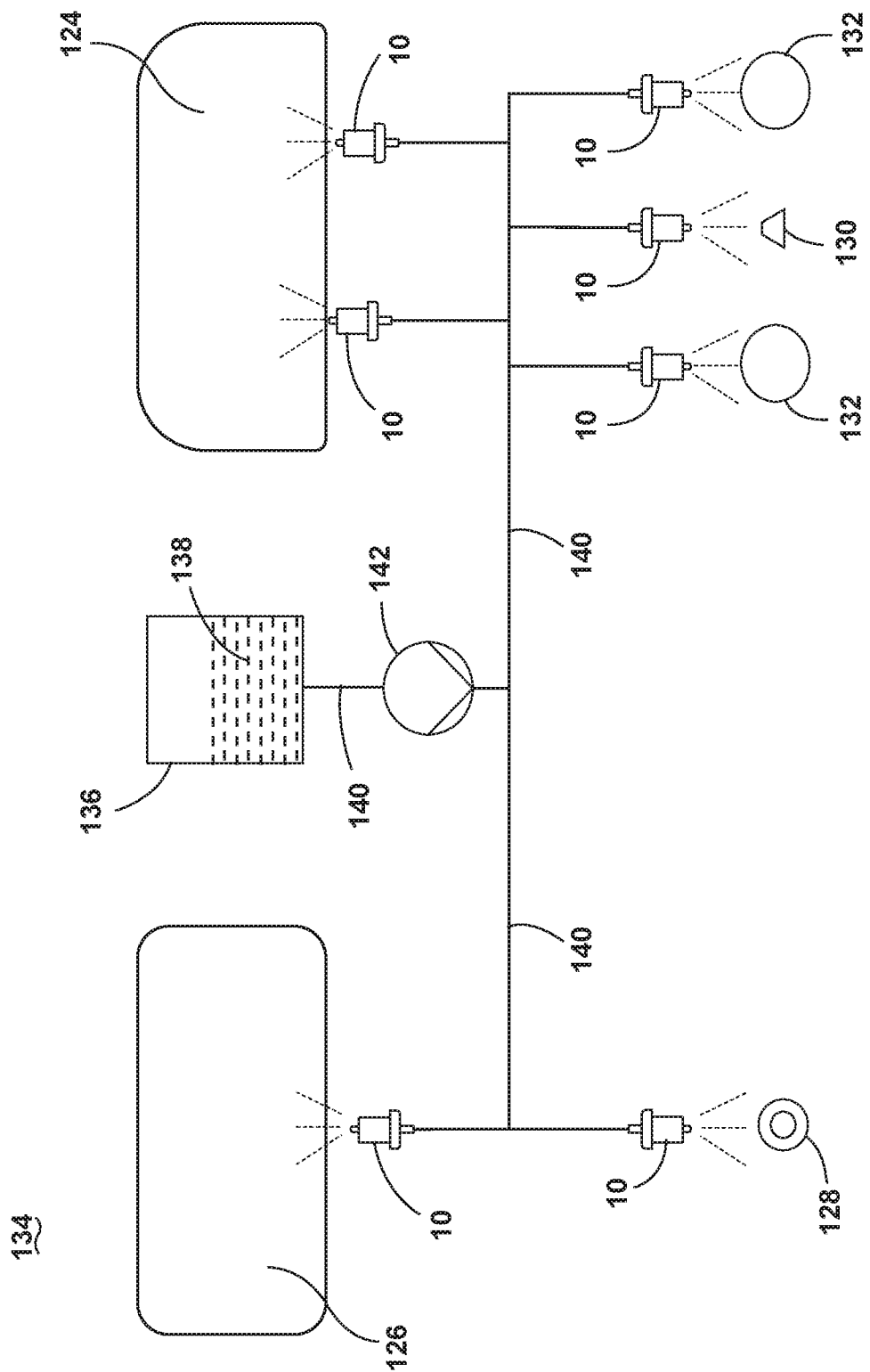
FIG. 5 is a schematic view of a system for cleaning a vehicle surface comprising the cleaning device of FIG. 1 according to yet another embodiment of the invention.

FIG. 5 shows an embodiment of a system 134 for cleaning a vehicle surface. The system 134 of FIG. 5 can be incorporated into the vehicle 122 of FIG. 4. The system 134 can include at least one fluid supply tank or reservoir 136 storing a supply of cleaning media 138, at least one telescoping device 10, as described with respect to FIGS. 1-3, applying the cleaning media 138 to the vehicle surface, and at least one conduit 140, hose, duct, and/or other tubing delivering the cleaning media 138 from the reservoir 136 to the telescoping device(s) 10. The system 134 can further include at least one pump 142 controlling the flow of cleaning media 138 from the reservoir 136 to the telescoping device(s) 10.

In the illustrated embodiment, telescoping devices 10 are provided for cleaning the front windshield 124, the rear windshield 126, the camera 128, the sensor 130, and the headlights or headlamps 132. Cleaning media 138 from the reservoir 136 is forced through the conduits 140 by the pump 142 and sprayed onto one or more of the vehicle surfaces 124-132 by the telescoping devices 10. Operation of the telescoping devices 10 is as described previously, with the piston extending once the fluid pressure exceeds the predetermined extension pressure, and the check valve 18 opening thereafter once the fluid pressure exceeds the cracking pressure. The supply of cleaning fluid to one or more of the telescoping devices 10 can be automated, with cleaning fluid being supplied automatically predetermined intervals or on an as-needed basis, or can be manual, such as by providing a switch (not shown) in the vehicle cabin that is manually-actuatable by a driver of the vehicle.

The cleaning system 134 can further be provided with one or more fluid control valves (not shown) to control the flow of cleaning media to the telescoping devices 10, such as for individual operation of each telescoping device 10, a heating element (not shown) heating the cleaning media before it is applied to the vehicle surface, and additional conduits, ducts, tubing, hoses, fluid connectors, and/or manifolds (not shown) fluidly coupling components of the system 134 together and providing a fluid flow path from the reservoir 136 to each telescoping device 10. Additionally, the system, 134 can comprise more than one reservoir and/or more than one pump.

Figure 6:
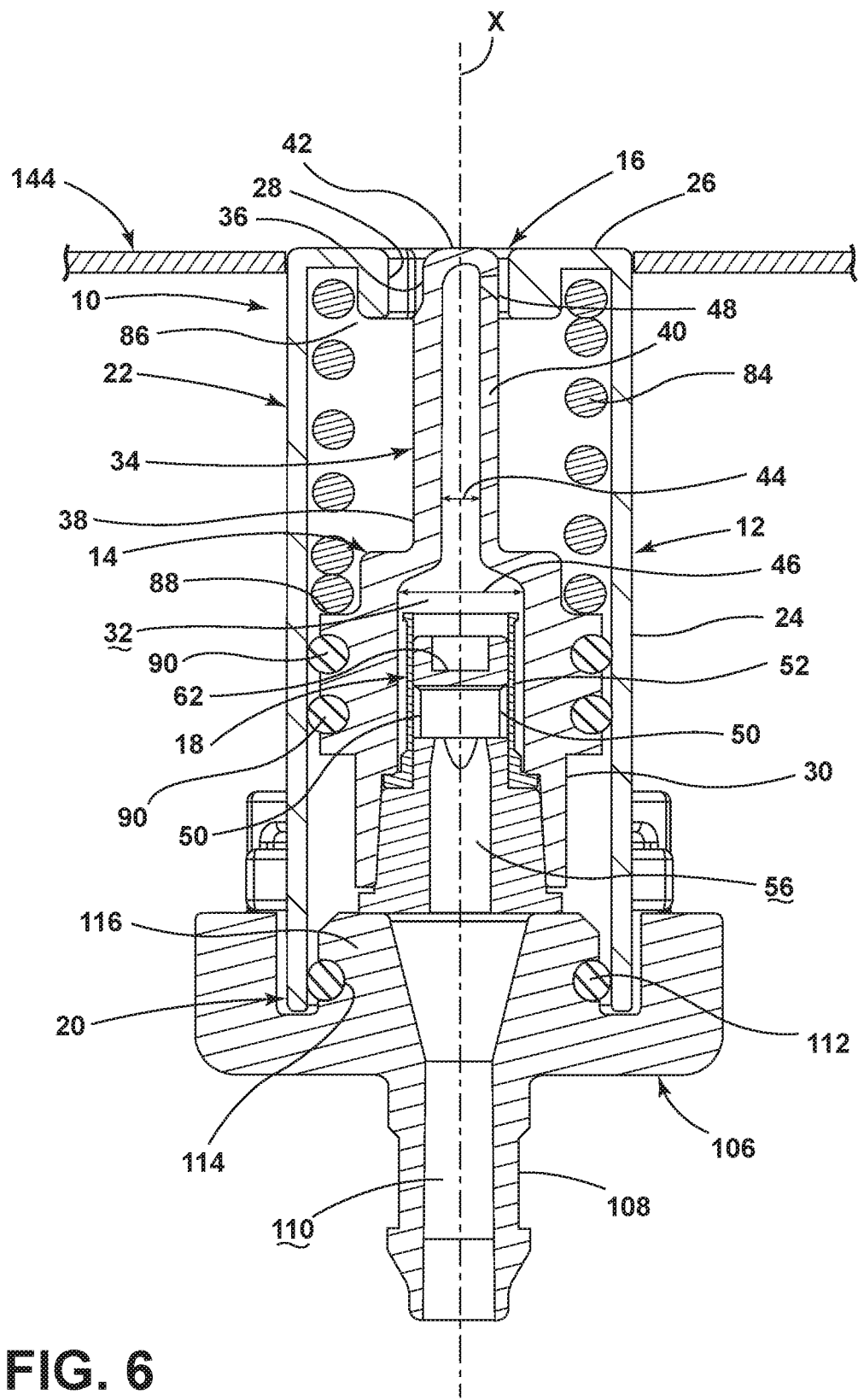
FIG. 6 is a cross-sectional view of a cleaning device in an inactive state according to yet another embodiment of the invention.

FIG. 6 shows an alternative embodiment of the telescoping cleaning device 10. The embodiment shown can be substantially similar to the embodiment described above with reference to FIGS. 1-3, save for the exclusion of the cover 98. Instead, the distal end wall 26 of the housing 12 can be flush with or otherwise form a contiguous or continuous surface with an adjacent vehicle surface 144, some non-limiting examples of which are a body panel, a bumper, a grill, a light, a lens or cover, or a trim component. In the inactive position (shown), the distal end wall 42 of the supply tube 34 can also be flush with or otherwise form a contiguous or continuous surface with the vehicle surface 144. In the active position (not shown), the distal end 36 of the supply tube 34, including the cleaning fluid outlet 16, is extended outwardly away from the vehicle surface 144. Optionally, one or both of the distal end wall 26 of the housing 12 and the distal end wall 42 of the supply tube 34 can include a Class A surface, i.e. a visible exterior surface of the vehicle.

Figure 7:
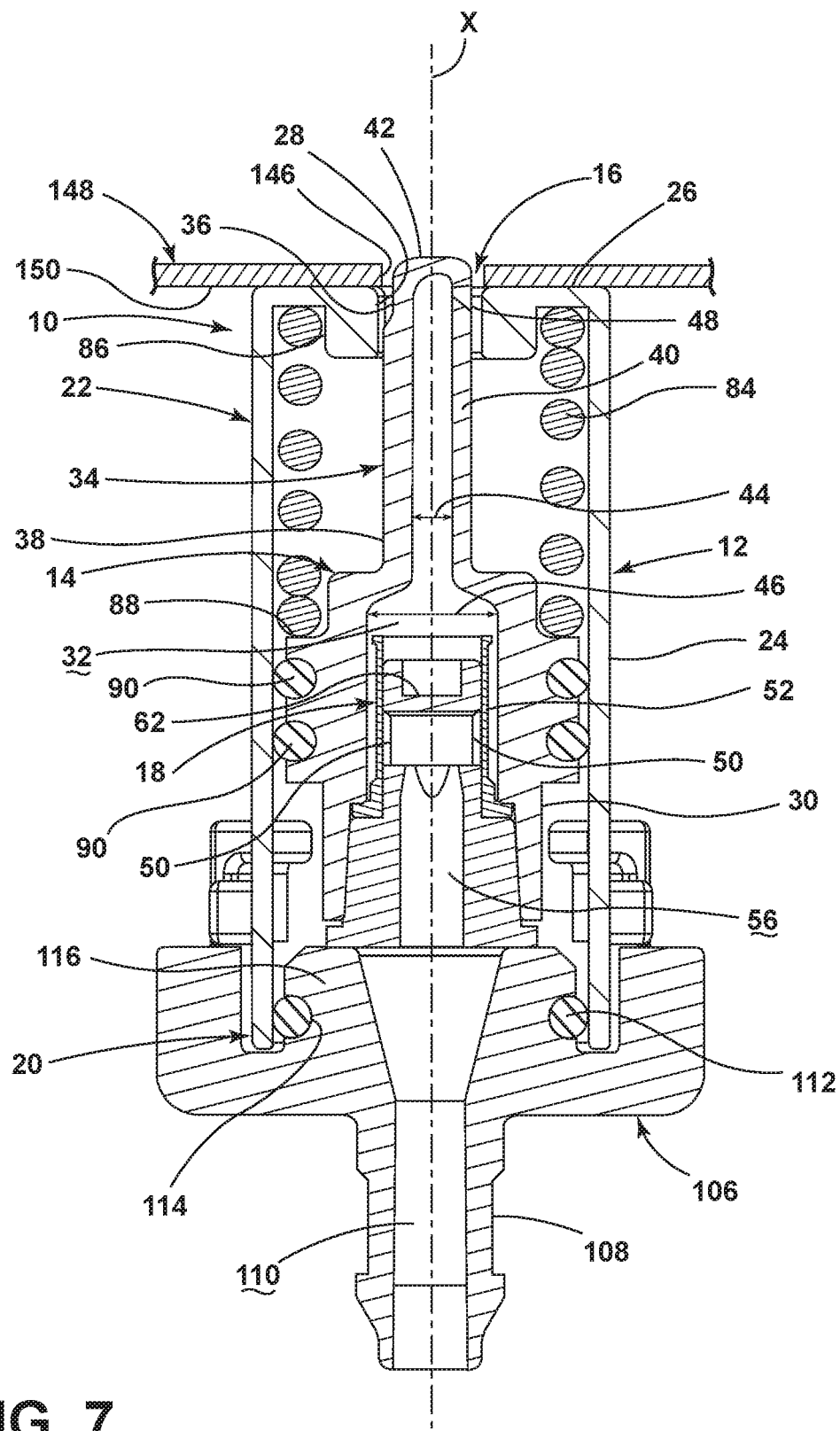
FIG. 7 is a cross-sectional view of a cleaning device in an inactive state according to still another embodiment of the invention.

FIG. 7 shows another alternative embodiment of the telescoping cleaning device 10. The embodiment shown can be substantially similar to the embodiment described above with reference to FIGS. 1-3, save for the relative orientation of the housing 12 and supply tube 34 distal ends, and the exclusion of the cover 98. In the illustrated embodiment, the supply tube 34 does not retract fully into the housing 12 in the inactive position (shown). Instead, the distal end 36 of the supply tube 34 remains outside the housing 12, and more particularly outside the distal end wall 26 of the housing 12. The cleaning fluid outlet 16 can reside within the housing 12 in the inactive position as shown, and can be projected outside the housing 12 by the movement of the piston 14 to the active position.

The supply tube 34 can be extendable and retractable through an opening 146 in a vehicle surface 148. In the inactive position (shown), the distal end wall 42 of the supply tube 34 can be flush with or otherwise form a contiguous or continuous surface with the adjacent vehicle surface 148, some non-limiting examples of which are a body panel, a bumper, a grill, a light, a lens or cover, or a trim component. In the active position (not shown), the distal end 36 of the supply tube 34, including the cleaning fluid outlet 16, is extended outwardly away from the vehicle surface 148. Optionally, the distal end wall 42 of the supply tube 34 can include a Class A surface, i.e. a visible exterior surface of the vehicle.

The housing 12 can be mounted on the interior of the vehicle surface 148, and can more specifically be mounted against an interior face 150 of the vehicle surface 148 to conserve space and provide a compact device 10. For example, in the illustrated embodiment, the distal end wall 26 of the housing 12 abuts an interior face 150 of the vehicle surface 148. In other embodiments, the distal end wall 26 of the housing 12 can be spaced from the interior face 150.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientations.

The term "proximal" as used herein refers to that end or portion which is situated toward the point of origin of fluid flow, i.e. toward the source of cleaning fluid and away from the cleaning fluid outlet 16. In the context of the present disclosure, the proximal end of the telescoping cleaning device 10 of the illustrated embodiments includes at least the proximal inlet end 20 of the housing 20, the end cap 106, and/or the inlet port 108.

The term "distal" as used herein refers to that end or portion which is situated away from the point of origin of fluid flow, i.e. toward the cleaning fluid outlet 16 and away from the source of cleaning fluid. In the context of the present disclosure, the distal end of the telescoping cleaning device 10 of the illustrated embodiments includes at least the distal outlet end 22 of the housing 20 and/or the distal end 36 of the supply tube 36.

The terms "connected" or "connect" are used herein in their broadest sense to mean and encompass the notions of being formed with, mounted or attached to, or otherwise joined.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. Any reference to elements in the singular, for example, using the articles "a," "an," "the," or "said," is not to be construed as limiting the element to the singular. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to."

The above description relates to general and specific embodiments of the disclosure. However, various alterations and changes can be made without departing from the spirit and broader aspects of the disclosure as defined in the appended claims, which are to be interpreted in accordance with the principles of patent law including the doctrine of equivalents. As such, this disclosure is presented for illustrative purposes and should not be interpreted as an exhaustive description of all embodiments of the disclosure or to limit the scope of the claims to the specific elements illustrated or described in connection with these embodiments.

Likewise, it is also to be understood that the appended claims are not limited to express and particular compounds, compositions, or methods described in the detailed description, which may vary between particular embodiments that fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

The invention claimed is:

1. A telescoping device for cleaning a vehicle surface, comprising:
   a housing having a proximal inlet end and a distal outlet end;
   an extendable piston arranged within the housing and moveable from an inactive position to an active position at a predetermined extension pressure, the piston comprising:
   a piston body defining a hollow interior;
   a supply tube coupled with the piston body at a proximal end of the supply tube;

at least one cleaning fluid outlet provided at a distal end of the supply tube, wherein the at least one cleaning fluid outlet is retracted into the housing in the inactive position and the at least one cleaning fluid outlet is extended from the housing in the active position; and a check valve coupled with the piston body for movement therewith and comprising a cracking pressure that is greater than the predetermined extension pressure, the check valve comprising:

at least one orifice in fluid communication with the hollow interior of the piston body;

a valve body coupled with a proximal end of the piston body for movement therewith, the valve body comprising a hollow tip comprising the at least one orifice, the hollow tip projecting into the hollow interior of the piston body with the at least one orifice disposed within the hollow interior of the piston body; and an elastomeric sleeve supported on the hollow tip and surrounding the at least one orifice; and a return spring biasing the piston toward the inactive position.

2. The telescoping device of claim 1, wherein the hollow tip comprises radially opposing orifices.

3. The telescoping device of claim 1, wherein the elastomeric sleeve is sealed at a proximal end thereof to the hollow tip of the valve body.

4. The telescoping device of claim 1, wherein the elastomeric sleeve has a proximal end sealed to the valve body and distal end unsealed to the valve body.

5. The telescoping device of claim 1, wherein the supply tube is retracted into the housing in the inactive position and wherein the distal end of the supply tube is substantially flush with the distal outlet end of the housing in the inactive position.

6. The telescoping device of claim 5, wherein the distal outlet end of the housing is partially closed by a distal end wall having an opening therein, the supply tube being extendable and retractable through the opening in the distal end wall of the housing, and the distal end of the supply tube is closed by a distal end wall, and the distal end wall of the supply tube is substantially flush with the distal end wall of the housing in the inactive position.

7. The telescoping device of claim 6, wherein the at least one cleaning fluid outlet comprises an aperture in the supply tube, wherein the aperture is disposed proximally of the distal end wall of the supply tube.

8. The telescoping device of claim 1, wherein the piston body and the supply tube are integrally formed.

9. The telescoping device of claim 1, and further comprising at least one O-ring seal between the piston body and the housing.

10. The telescoping device of claim 1, and further comprising an end cap on the proximal inlet end of the housing.

11. The telescoping device of claim 10, wherein the end cap comprises an inlet port fluidly connectable to a source of pressurized cleaning media.

12. The telescoping device of claim 10, wherein a proximal end of the check valve abuts the end cap in the inactive position.

13. The telescoping device of claim 1, and further comprising a cover arranged over a distal end of the supply tube.

14. The telescoping device of claim 13, wherein the cover comprises a Class A surface of a vehicle.

15. The telescoping device of claim 1, wherein the return spring is positioned between the distal outlet end of the housing and the piston body, and surrounds the supply tube.

16. The telescoping device of claim 1, wherein the supply tube has an inner diameter less than an inner diameter of the hollow interior of the piston body.

17. The telescoping device of claim 1, wherein the at least one cleaning fluid outlet comprises a radial aperture in the supply tube.

18. The telescoping device of claim 1, wherein the valve body comprises a fluid passage providing a pathway for cleaning fluid through the valve body, the fluid passage extending from an inlet at a proximal end of the valve body to the at least one orifice, which defines an outlet of the fluid passage.

19. The telescoping device of claim 18, wherein the valve body comprises a closed distal end, with the at least one orifice disposed proximally of the closed distal end.

20. A vehicle comprising:
a vehicle surface; and
a telescoping device for cleaning the vehicle surface, the telescoping device comprising:
a housing having a proximal inlet end and a distal outlet end;
an extendable piston arranged within the housing and moveable from an inactive position to an active position at a predetermined extension pressure, the piston comprising:
a piston body defining a hollow interior;
a supply tube coupled with the piston body at a proximal end of the supply tube;
at least one cleaning fluid outlet provided at a distal end of the supply tube, wherein the at least one cleaning fluid outlet is retracted into the housing in the inactive position and the at least one cleaning fluid outlet is extended from the housing in the active position; and
a check valve coupled with the piston body for movement therewith and comprising a cracking pressure that is greater than the predetermined extension pressure, the check valve comprising:
at least one orifice in fluid communication with the hollow interior of the piston body;
a valve body coupled with a proximal end of the piston body for movement therewith, the valve body comprising a hollow tip comprising the at least one orifice, the hollow tip projecting into the hollow interior of the piston body with the at least one orifice disposed within the hollow interior of the piston body; and
an elastomeric sleeve supported on the hollow tip and surrounding the at least one orifice; and
a return spring biasing the piston toward the inactive position.

21. The vehicle of claim 20, wherein the telescoping device comprises a cover arranged over a distal end of the supply tube, the cover comprising a Class A surface of the vehicle.

22. A system for cleaning a vehicle surface comprising:
a fluid reservoir;
a pump in fluid communication with the fluid reservoir; and
a telescoping device for cleaning the vehicle surface, the telescoping device comprising:
a housing having a proximal inlet end in fluid communication with the pump and a distal outlet end;

an extendable piston arranged within the housing and moveable from an inactive position to an active position at a predetermined extension pressure, the piston comprising:
  a piston body defining a hollow interior;
  a supply tube coupled with the piston body at a proximal end of the supply tube;
  at least one cleaning fluid outlet provided at a distal end of the supply tube, wherein the at least one cleaning fluid outlet is retracted into the housing in the inactive position and the at least one cleaning fluid outlet is extended from the housing in the active position; and
  a check valve coupled with the piston body for movement therewith and comprising a cracking pressure that is greater than the predetermined extension pressure, the check valve comprising:
    at least one orifice in fluid communication with the hollow interior of the piston body;
    a valve body coupled with a proximal end of the piston body for movement therewith, the valve body comprising a hollow tip comprising the at least one orifice, the hollow tip projecting into the hollow interior of the piston body with the at least one orifice disposed within the hollow interior of the piston body; and
    an elastomeric sleeve supported on the hollow tip and surrounding the at least one orifice; and
  a return spring biasing the piston toward the inactive position.

23. The telescoping device of claim 22 and further comprising first tubing coupling the pump with the fluid reservoir and second tubing coupling the pump with the telescoping device.

* * * * *